US012175879B2

(12) United States Patent
Huncha et al.

(10) Patent No.: US 12,175,879 B2
(45) Date of Patent: Dec. 24, 2024

(54) SYSTEMS AND METHODS FOR CONSTRUCTING TERRAIN DECONFLICTED CUSTOM PROCEDURES

(71) Applicant: HONEYWELL INTERNATIONAL INC., Charlotte, NC (US)

(72) Inventors: Pradeep Huncha, Bangalore (IN); Sreenivasan Govindillam, Bangalore (IN); Ratan Khatwa, Redmond, WA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 279 days.

(21) Appl. No.: 17/659,975

(22) Filed: Apr. 20, 2022

(65) Prior Publication Data

US 2023/0282123 A1 Sep. 7, 2023

(30) Foreign Application Priority Data

Mar. 4, 2022 (IN) ............................. 202211011856

(51) Int. Cl.
*G08G 5/02* (2006.01)
*G08G 5/00* (2006.01)
*G08G 5/04* (2006.01)

(52) U.S. Cl.
CPC ........... *G08G 5/025* (2013.01); *G08G 5/0021* (2013.01); *G08G 5/0039* (2013.01); *G08G 5/006* (2013.01); *G08G 5/0086* (2013.01); *G08G 5/045* (2013.01)

(58) Field of Classification Search
CPC .... G08G 5/025; G08G 5/0021; G08G 5/0039; G08G 5/006; G08G 5/0086; G08G 5/045
See application file for complete search history.

(56) References Cited

U.S. PATENT DOCUMENTS

| | | | | |
|---|---|---|---|---|
| 8,019,491 B1 | 9/2011 | McCusker | | |
| 8,073,578 B1 * | 12/2011 | McCusker | G08G 5/0039 701/8 | |
| 8,234,068 B1 | 7/2012 | Young et al. | | |
| 8,797,190 B2 | 8/2014 | Kolbe et al. | | |
| 8,965,600 B2 | 2/2015 | Kolbe et al. | | |
| 11,119,510 B2 | 9/2021 | Saunders et al. | | |
| 2010/0030401 A1 * | 2/2010 | Rogers | G08G 5/0039 701/3 | |
| 2019/0279514 A1 * | 9/2019 | Ramachandra | G08G 5/0052 | |
| 2021/0042281 A1 | 2/2021 | Howe | | |
| 2021/0097869 A1 * | 4/2021 | Piradi | G01C 21/20 | |

FOREIGN PATENT DOCUMENTS

CN 108803656 B 9/2020

* cited by examiner

*Primary Examiner* — Navid Z. Mehdizadeh
*Assistant Examiner* — Oliver Tan
(74) *Attorney, Agent, or Firm* — Lorenz & Kopf LLP

(57) ABSTRACT

Systems and methods for creating a custom approach procedure are provided. The systems and methods receive a plurality of user entered waypoints constituting a provisional custom approach procedure from a user interface. A three-dimensional (3D) flight path is constructed connecting the way points with the constraint that the 3D flight path is a descent path with no climb segments. Terrain data along the 3D flight path is obtained from a terrain database. The 3D flight path is assessed with respect to the terrain data to detect one or more terrain conflicts. An output is generated and provided to the user interface based on the detected one or more terrain conflicts.

20 Claims, 8 Drawing Sheets

SYSTEMS AND METHODS FOR CONSTRUCTING TERRAIN DECONFLICTED CUSTOM PROCEDURES

CROSS-REFERENCE TO RELATED APPLICATION

This application claims priority to India Provisional Patent Application No. 202211011856, filed Mar. 4, 2022, the entire content of which is incorporated by reference herein.

TECHNICAL FIELD

The subject matter described herein relates to custom or pilot entered procedures in an aircraft.

BACKGROUND

Custom or contingency procedures are intended to provide an alternate lateral and/or vertical routing to published procedures or those included in a navigation database accessed by a Flight Management System (FMS). Exemplary scenarios for entering such manual or custom procedure are when there is diminished aircraft performance and following a known procedure is not viable or when there is a published procedure available that is not included in a navigation database. Alternate routes may also be required to manage external conditions like weather/NOTAMS, internal aircraft conditions like degradation or a combination of both.

A flight crew member can insert waypoints defining a custom procedure using a flight deck interface. For example, lateral and longitudinal locations for each waypoint may be entered through a Control Display Unit (CDU) of the FMS. The pilot may enter a flight path angle, descent rate or altitude in association with each waypoint. After the full set of pilot entered waypoints have been defined, the custom procedure may be submitted to the FMS as a track to fix program so that the aircraft intercepts the custom procedure.

Some existing systems for entering custom procedures are offline in the sense that the waypoints are fully entered before connecting the custom procedure to the FMS. The interface for entry of waypoints does not link with terrain information. Whilst there may be a Terrain Avoidance and Warning System (TAWS), this will provide terrain alerts and advisories only after submitting the custom procedure to the FMS and once flying of the custom procedure has commenced. One result will be alerts and warnings being issued that can exacerbate an already stressful situation and which may require the pilot to re-define part or all of the custom procedure, which takes time and focus in a high workload scenario. In case of emergency events, it is crucial to avoid the alerts and warnings that could have been handled as part of strategic custom or contingency procedure design.

It is desirable to provide methods and systems facilitate custom/contingency procedure planning by reducing post-planning workload and alerts and by increasing safety of mission planning. It would further be desirable to provide advisories to better define a custom procedure at the planning stage. Furthermore, other desirable features and characteristics of the present invention will become apparent from the subsequent detailed description and the appended claims, taken in conjunction with the accompanying drawings and the foregoing technical field and background.

BRIEF SUMMARY

In one aspect, a method for creating a custom approach procedure is provided. The method includes receiving, via at least one processor a plurality of user entered waypoints and from a user interface. The plurality of user entered waypoints constitute a provisional custom approach procedure. The method includes constructing, via the at least one processor, a three-dimensional (3D) flight path connecting the way points with the constraint that the 3D flight path is a descent path with no climb segments. The method includes obtaining, via the at least one processor, terrain data along the 3D flight path from a terrain database. The method includes assessing, via the at least one processor, the 3D flight path with respect to the terrain data to detect one or more terrain conflicts. The method includes generating, via the at least one processor, an output to the user interface based on the detected one or more terrain conflicts. The method includes receiving a user response to the detected one or more terrain conflicts that adjusts at least one of the user entered waypoints. The method includes reconstructing a revised 3D flight path based on the user response, the revised 3D flight path being reconstructed as a descent path with no climb segments. The method includes iteratively performing, via the at least one processor, the assessing, generating, receiving and reconstructing steps until terrain conflicts are not detected, thereby providing a terrain deconflicted custom approach procedure constituted by the user entered waypoints.

In embodiments, the output includes at least one recommended lateral and/or altitude and/or flight path angle constraint for one or more of the waypoints that avoids the one or more terrain conflicts.

In embodiments, the output includes an advisory of terrain conflict.

In embodiments, the output includes inserting at least one lateral and/or altitude and/or flight path angle constraint for one or more of the waypoints or other part of the 3D flight path to remove the one or more terrain conflicts.

In embodiments, the terrain data is arranged in grid cells. The grid cells associated with the 3D flight path are determined, peak terrain elevation data for each grid cell is extracted from the terrain database as the terrain data and the assessing step includes assessing with respect to peak terrain elevation data.

In embodiments, constructing and reconstructing the 3D flight path includes factoring in at least one of: temperature compensated altitudes, any degraded aircraft performances, weather and flying restrictions.

In embodiments, the output to the user interface includes a vertical situation interactive display configured to receive vertical revisions to the 3D flight path. In one embodiment, the vertical revisions include at least one of angle, altitude and steps. In an embodiment, the vertical situation interactive display includes a depiction of the terrain data.

In embodiments, the terrain data is arranged in grid cells of adaptable resolution and the terrain data is called with a grid resolution based on required navigation performance.

In embodiments, assessing the 3D flight path with respect to the terrain data to detect the one or more terrain conflicts includes comparing terrain height plus a safety or clearance margin with the 3D flight path. In one embodiment, the safety or clearance margin is adapted based on accuracy of navigation performance.

In embodiments, the method includes submitting, via the at least one processor, the terrain deconflicted custom approach procedure to a Flight Management System of the aircraft.

In embodiments, receiving the plurality of user entered waypoints includes allowing user entry of waypoints by a rubber banding technique.

In embodiments, the constructing the three-dimensional (3D) flight path begins at a final leg connecting a landing site and a final waypoint and wherein the assessing, generating, receiving and reconstructing are performed by sequential back propagation from the final leg. In another aspect, a system for creating a custom approach procedure is provided. The system includes a user interface and at least one processor in operable communication with the user interface. The at least one processor is configured to execute program instructions to cause the at least one processor to: receive a plurality of user entered waypoints constituting a provisional custom approach procedure from the user interface; construct a three-dimensional (3D) flight path connecting the way points with the constraint that the 3D flight path is a descent path with no climb segments; obtain terrain data along the 3D flight path from a terrain database; assess the 3D flight path with respect to the terrain data to detect one or more terrain conflicts; generate an output to the user interface based on the detected one or more terrain conflicts; receive a user response to the detected one or more terrain conflicts that adjusts at least one of the user entered waypoints; reconstruct a revised 3D flight path based on the user response, the revised 3D flight path being reconstructed as a descent path with no climb segments; and iteratively perform the assessing the 3D flight path, generating the output, receiving the user response and reconstructing the revised 3D flight path until terrain conflicts are not detected, thereby providing a terrain deconflicted custom approach procedure constituted by the user entered waypoints.

In embodiments, the output includes at least one recommended lateral and/or altitude and/or flight path angle constraint for one or more of the waypoints that avoids the one or more terrain conflicts.

In embodiments, the output includes an advisory of terrain conflict.

In embodiments, the terrain data is arranged in grid cells, the grid cells associated with the 3D flight path are determined, peak terrain elevation data for each grid cell is extracted from the terrain database as the terrain data and the assessing step includes assessing with respect to peak terrain elevation data.

In embodiments, receiving the plurality of user entered waypoints includes allowing user entry of waypoints by a rubber banding technique.

The above described aspects and embodiments relating to a method are applicable to the system aspect.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
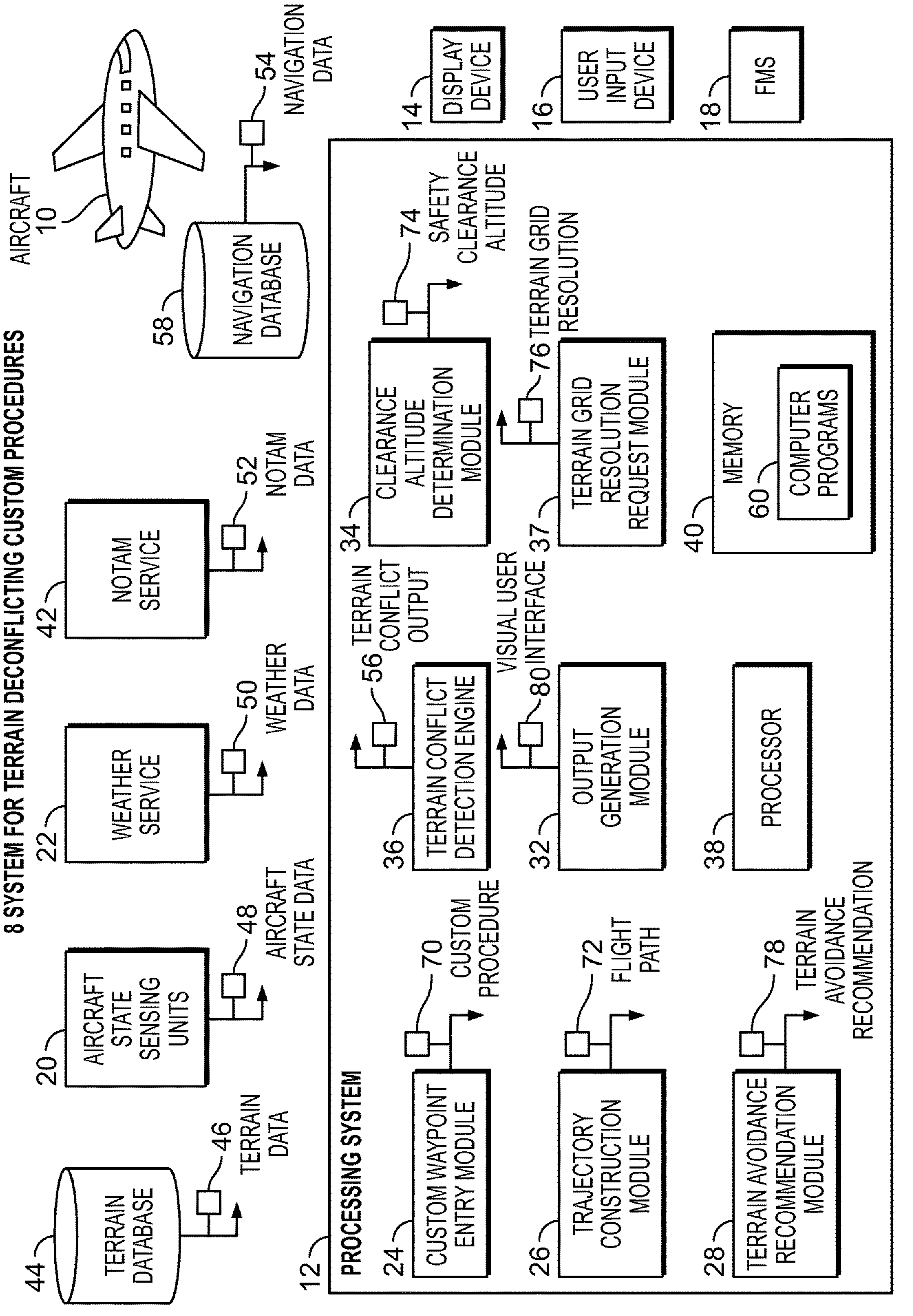
FIG. 1 is a block diagram of system for terrain deconflicting custom procedures, in accordance with an exemplary embodiment.

Systems and methods described herein provide a user interface for entering custom/contingency procedures. The custom procedure could be either created by the pilot (or other flight crew member) or an operative at an operations center. The custom procedure could be created as a series of TF (Track to Fix) legs, or a published procedure could be modified. Altitude and speed constraints may be added as needed. The systems and methods provide advisories, suggestions and automatic procedure modifications as part of custom/contingency procedures design. The planning application for entering custom waypoints is integrated with a terrain database and optionally also a navigation database and aircraft capabilities. The system could be realized in cockpit avionics or as a connected solution (e.g. an Electronic Flight Bag (EFB)).

The systems and methods described herein may result in safer operations through: terrain integration with custom procedure planning; providing advisories on terrain conflicts; providing recommendations as to terrain avoidance; allowing modifications at the planning stage to the procedure to avoid terrain; and taking into account current aircraft capabilities during the planning phase.

The systems and methods generate a fight path (trajectory) that follows the pilot entered waypoints by factoring-in current aircraft capabilities. A custom route is designed as a sequence of waypoints. The pilot may insert one or more waypoints by coordinate entry, selection on a map or rubber banding or a combination thereof by using a graphical interface. After each waypoint has been entered, terrain features for the flight path are fetched from a terrain database. The number of points assessed along the flight path may be set by grid resolution of the terrain database. The predicted flight path terminating at the waypoint position is extrapolated to find the grid cells along the anticipated path. If the predicted altitude along the flight path, specifically the peak terrain elevation within the cell for any of the extrapolated positions, is within a predefined alert limit, an alert is issued to the crew. Along with an alert, the systems and methods may suggest an altitude at which the flight path could pass through the waypoint of interest. This altitude ensures that there is no terrain incursion along the anticipated path. Alternately, path constraints (angle, altitude or a combination of both) can be inserted into the path and a prompt for pilot review of the recommended constraint is issued. In this way, measures to strategically avoid a possible terrain incursion are accounted for in a custom procedure planning stage before submission to the FMS.

An exemplary workflow for creation of a custom procedure may follow the forthcoming steps. A pilot prepares a procedure (e.g. an arrival or departure) as a series of custom waypoints based on the intended geometry of the procedure. The custom waypoints are defined by the pilot. The custom waypoints are either entered as coordinates, selected on a map or rubber banded (by clicking desired points on the map display and dragging flight legs) by the pilot. Based on the latitude and longitude of the waypoints, terrain elevation is assessed per the grid resolution for each of the waypoint positions and a predicted trajectory. The system computes the predicted altitude per the trajectory. The system checks the terrain grid features (peak elevation) along the predicted path by extrapolating the predicted position. If terrain elevation affects the path, an advisory of terrain conflict is issued to the pilot. The waypoints or segments may be displayed on a vertical situation display using a color indicating terrain conflict or using any other symbols providing an indication of terrain conflict such as potential incursion at latitude/longitude, predicted altitude and grid peak altitude. The vertical situation display may further include a representative depiction of scale and location of the terrain based on information pulled from the terrain database. The pilot may take appropriate action by modifying a lateral or vertical path to resolve the potential terrain conflict/incursion. Alternatively, the system may suggest the revised path of avoidance (by assigning appropriate path constraints) for pilot review and acceptance. If terrain elevation does not affect the predicted path, the inserted waypoint is displayed like other waypoints. After review, the pilot can activate the pending flight plan with the procedure by submission to the FMS. In embodiments, an advisory is issued if the difference between terrain elevation and predicted altitude is less than a safety margin. An advisory is not issued if there is enough clearance between terrain and the predicted altitude. Custom procedures could also be defined by modifying a procedure available in the navigation database.

The systems and methods described herein may propose altitude constraints or Flight Path Angle (FPA) constraints for insertion at the time of procedure creation within the cockpit or using an offboard device. Based on the position of the waypoints, the terrain altitude is fetched from the terrain database. When a potential terrain conflict is predicted, a pseudo waypoint may be created with an altitude constraint above the terrain altitude with sufficient margin or the descent angle may be adjusted to avoid the terrain with an indication to the pilot. Thus, altitude and FPA constraints are added to the procedure to avoid terrain at the planning phase itself.

In a visual approach, the system allows a flight crew member to enter a descent angle and leg distance for the visual approach. Terrain details are fetched along the path constructed. If significant terrain is there, a visual indication thereof is provided such as on a Touch Screen Controller (TSC) snapshot. An intuitive depiction of a vertical profile may be provided in the custom approach page during a strategic planning phase. The system may suggest a leg distance and descent angle to avoid the terrain. Thus, a terrain scenario is assessed, depicted and avoided with suggestions while planning visual approaches.

FIG. 1 depicts an exemplary embodiment of a system 8 for terrain deconflicting custom procedures. The system 8 is associated with an aircraft 10. The illustrated system 8 includes a processing system 12 configured to allow entry of waypoints defining a custom procedure (e.g. a custom approach procedure). The processing system 12 retrieves terrain data 46 from a terrain database 44 and assess the terrain data with respect to a flight path that has been constructed to connect the custom waypoints. The processing system detects any conflicts with terrain along the flight path and provides an terrain conflict output 56 to the user reporting the potential conflict. The terrain conflict output 56 can include an advisory or a recommendation for changing the flight path to avoid the terrain conflict. The processing system 12 repeats the process of detecting terrain conflicts and adjusting the flight path until no terrain conflicts are included in the flight path. In applications where the custom procedure is an approach procedure, the flight path is constrained to a descent path with no climb segments.

The system 8 is implemented, at least in part, by a processing system 806 as described in further detail below with respect to FIG. 8. The processing system 806 executes programming instructions to detect and resolve terrain conflicts during a planning phase of a custom procedure as described in further detail herein. It should be appreciated that FIG. 1 is a simplified representation of the system 8 associated with an aircraft 10 for purposes of explanation and is not intended to limit the subject matter in any way. In this regard, it will be appreciated that, in practice, the system 8 onboard the aircraft 10 may include any number of different onboard systems configured to support operation of the aircraft 10, and the subject matter described herein is not limited to any particular type or number of onboard systems. It should further be appreciated that the processing system 12 of FIG. 1 may be provided onboard the aircraft 10 or may be offboard as part of a connected service. For example, processing system 12 may be included in a cloud service or as part of an Electronic Flight Bag (EFB) service.

The system 8 includes a Flight Management System (FMS) 18, which is an on-board multi-purpose navigation, performance, and aircraft operations computer. The FMS 18 is configured to assist with navigation of the aircraft 10 according to the parameters presented within the flight plan. As a component of the avionics of the aircraft 10, the FMS 18 is a specialized computing system that can automate a wide variety of inflight tasks and reduce the workload on the flight crew (e.g., pilots). In particular, a primary function performed by the FMS 18 is overall management of the flight plan. Managing the flight plan may involve using aircraft sensor measurements, such as measurements from the aircraft's global positioning system (GPS), inertial navigation system (INS), and radio navigation, to determine the aircraft's position in order to help guide the aircraft 10 along the flight plan. For instance, the FMS 18 may help a pilot follow waypoints set forth within the flight plan. In some instances, the FMS 18 may also help automatically navigate the aircraft 10 according to the waypoints of the flight plan.

The FMS 18 may help guide the aircraft 10 using the input and display interfaces of the aircraft's navigation system. For instance, the FMS 18 may display a visual representation of the flight plan for pilots to follow on one of the navigation system's display interface. An example visual representation associated with a flight plan may display an overview of areas traversed during the flight path along with visual indicators of the different waypoints that can be used to guide the aircraft 10. The visual representation can be used to display other information for the pilot to utilize, including altitude measurements, temperature readings, and distances to waypoints, etc. The visual representation may also be used to provide alerts to inform the pilots of detected events during navigation of the flight plan. The FMS 18 may also be configured to receive and accommodate inputs from the pilot. For instance, the FMS 18 may adjust the visual representation or modify aspects of the flight plan (e.g., the flight path) in response to inputs provided by the pilot.

The FMS 18 may construct a flight plan based on navigation data 54 provided by a navigation database 58. The navigation database 58 may contain the elements from which a flight plan is constructed. For instance, the navigation database 58 may convey maps and routes available for constructing the flight plan. These elements may be defined via the ARINC 424 standard. The information within the navigation database 58 may be updated routinely to ensure that its contents are current. In some examples, the navigation database 58 may include information related to waypoints, airways, radio navigation aids (e.g., distance measuring equipment (DME), VHF omnidirectional range (VOR), non-directional beacons (NDBs), and instrument landing systems (ILSs), airports, runways, standard instrument departure (SID), standard terminal arrival (STAR), holding patterns, instrument approach procedure (IAP), and other possible data. In some instances, the navigation database 58 may not include a required procedure such as an approach to a particular airfield or runway not being included in the navigation database. In such an instance, a pilot may need to define a custom approach procedure without reference material or may need to enter a custom procedure by reference to a published chart for that airfield.

The processing system 12 has access to the terrain database 44. The terrain database 44 provides a digital representation of terrain and obstacles as datasets for a series of airborne and ground applications such as Enhance Ground Proximity Warning System (EGPWS), Terrain Avoidance and Warning System (TAWS), Advanced Surface Movement Guidance and Control System (A-SMGCS), Minimum Safe Altitude Warning (MSAW), etc. A terrain dataset is a digital representation of the elevation of the terrain at a number of discrete points. Major features of the terrain database 44 include geometric distribution/position of discrete points, horizontal/vertical datum and specific units of measurement. The terrain database 44 includes a digital representation of a surface of the Earth containing naturally occurring features such as mountains, hills, ridges, valleys, bodies of water, permanent ice and snow, and excluding obstacles. The terrain database 44 further includes a digital representation of obstacles which includes the horizontal and vertical extent of man-made and natural significant features. Terrain elevation data in the terrain database 44 is arrange in three-dimensional grid cells, with a terrain elevation value (e.g. peak elevation) included in each cell. A resolution (volume) of the grid cells may vary depending on location. For example, a finer resolution (smaller volume) of grid cells may be provided at locations around airports as compared to oceanic airspace.

The processing system 12 is in communication with aircraft state sensing unites 20, which provide aircraft state data 48 representing a current performance of the aircraft 10. The aircraft state data 48 may convey limitations associated with operation of the aircraft 10. The limitations may depend on the size, weight, fuel capacity, and engine type of the aircraft. The performance of the aircraft may depend on aircraft degradations in the aircraft 10 that are prevailing such as a failed engine, limited fuel, or a hardware failure of any kind associated with the aircraft. 10. The processing system 12 may factor in the aircraft state data 48 when constructing a flight path by modelling the aircraft degraded performance according to the aircraft state data 48. Speed, altitude, distance, flight path angle, etc. limitations may be modelled by the processing system 12. The processing system 12 may further model factors including weather data 50 from a weather service 22, NOTAM data 52 from a NOTAM service 42 and any other sources of information that may impact flight path modelling. Thus, airspace and airport (e.g. runway) restrictions included in the NOTAM data 52 (or other data) can be considered when constructing a flight path. Further, any impact of weather on the flight path can also be modelled such as wind direction and magnitude and hazardous weather to be avoided.

The system 8 may further include a user input device 16 allowing a user to enter custom waypoints. The user input device 16 may be in the form of a cursor control device or a touch screen control device. The user input device 16 may additionally or alternatively include a keyboard. The user input device 16 allows a user to enter waypoint coordinates. The waypoint coordinates may be entered by selecting or keying in coordinates or by selection within a lateral and/or vertical map. Waypoints and flight legs connecting waypoints may be adjusted by a dragging function. A combination of selecting points on a map and dragging flight legs is referred to as rubber banding, which is a technique that may be input through the user input device 16 in order to define a custom procedure. The user input device 16 may be operated to modify an existing flight plan from the navigation database 58 (such as an approach procedure) or a new custom procedure may be wholly defined by pilot entry via the user input device 16. Exemplary user interfaces for inputting the custom procedure are described in further detail below.

In the exemplary embodiment of FIG. 1, the processing system 12 includes a custom waypoint entry module 24, a trajectory construction module 26, a terrain avoidance recommendation module 28, a terrain conflict detection engine 36, a clearance altitude determination module 34, a terrain grid resolution request module 37, an output generation module 32, a processor 38, memory 40 and one or more computer programs 60.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Although a single processor 38 is illustrated, more than one processor may be provided. The processor 38 can be any custom made or commercially available processor, a central processing unit (CPU), a graphics processing unit (GPU), an auxiliary processor among several processors associated with the processing system 12, a semiconductor based microprocessor (in the form of a microchip or chip set), a macroprocessor, any combination thereof, or generally any device for executing instructions. The memory 40 may be any computer readable storage device or media and may include volatile and nonvolatile storage in read-only memory (ROM), random-access memory (RAM), and keep-alive memory (KAM), for example. KAM is a persistent or non-volatile memory that may be used to store various operating variables while the processor 38 is powered down. The memory 40 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processing system 12.

The computer programs 60 embody computer readable instructions, each of which comprises an ordered listing of executable instructions for implementing logical functions. The instructions, when executed by the processor 38, provide a user interface for a user to enter a custom procedure including a series of waypoints, constructs a flight path, assesses the flight path with respect to terrain along the flight path and advises the user as to any terrain conflicts. Generally, the various modules 24, 26, 28, 32, 36 and the terrain conflict detection engine 36 are embodied in the computer programs 60 and are executed by the processor 38 performing the logic, algorithms and calculations defined thereby.

Figure 2:
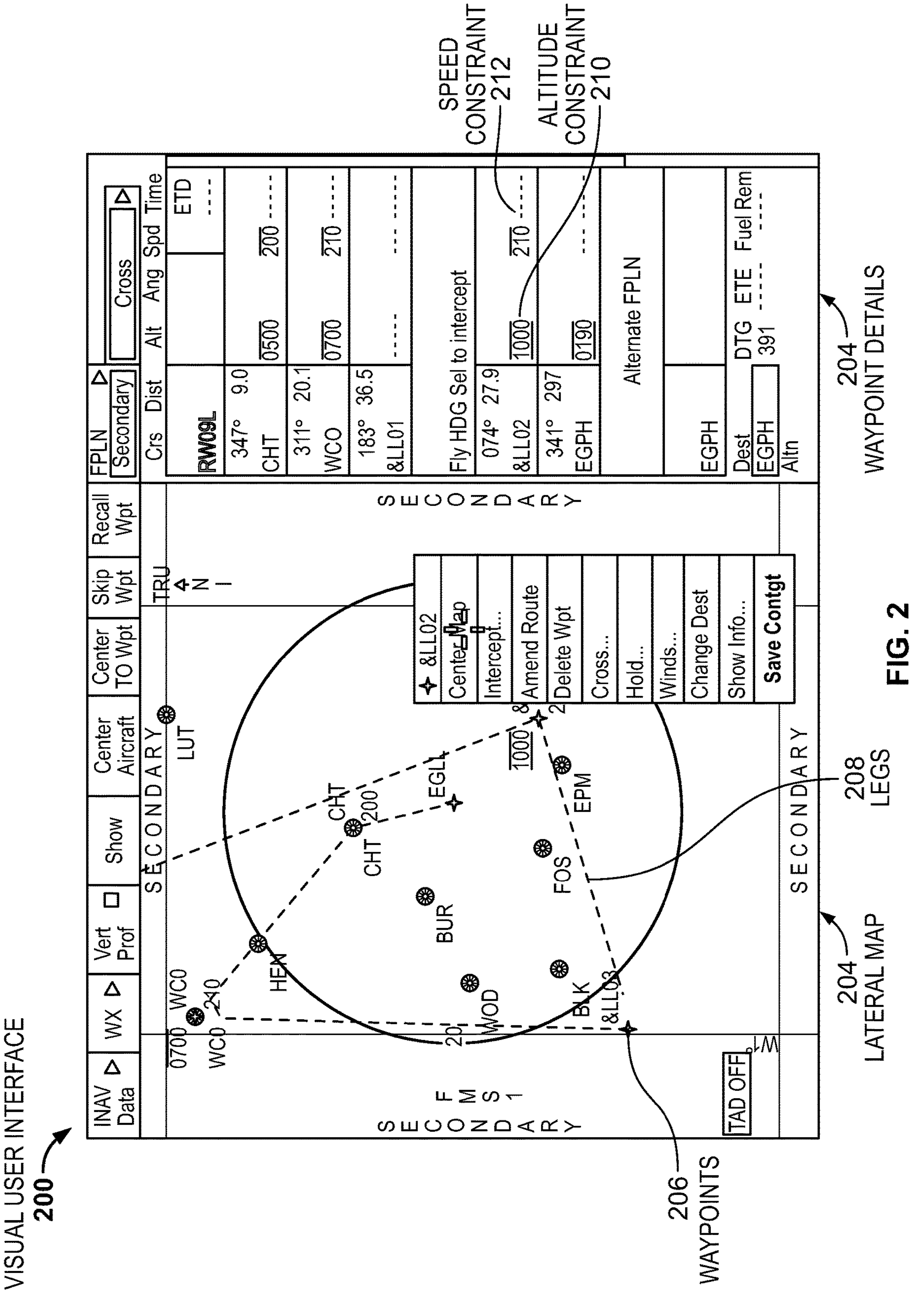
FIG. 2 depicts an exemplary visual user interface for entering a custom procedure, in accordance with exemplary embodiments.

The custom waypoint entry module 24 generates a visual user interface 200 (see FIG. 2) to be displayed via the display device 14. With additional reference to FIG. 2, the visual user interface 200 allows a user to enter a series of custom waypoints 206 on a lateral map 202 so as to define longitudinal and lateral locations of each custom waypoint 206. In the exemplary embodiment, the waypoints 206 are entered by selecting one or more points on the lateral map 202 and dragging legs 208 connecting successive waypoints 206. This technique of entering points by selecting and dragging is called rubber banding. The waypoints 206 may be entered by touchscreen, key entry or cursor control device as the user input device 16 by way of example. The waypoints 206 define a custom approach procedure leading to airport EGPH. One or more of the waypoints 206 may be associated with speed (vertical speed, airspeed or ground speed) constrains and altitude constrains. A flight path angle constraint may additionally or alternatively be defined. The constraints can be in the form of greater than, less than or equal to constraints. The custom waypoint entry module receives user entry of the custom waypoints 206 and outputs a provisional custom procedure 70 constituted at least by the entered custom waypoints 206.

The trajectory construction module 26 is configured to receive the custom procedure 70 and construct a flight trajectory. In one embodiment, the trajectory construction module 26 is connected to the FMS 18, which includes trajectory construction capabilities. In another embodiment, the trajectory construction module is included in a remote FMS algorithm. In other embodiments, a dedicated trajectory construction capability provided for the trajectory construction module 26. As previously described herein, the trajectory construction module 26 factors in any degraded performance of the aircraft 10, any relevant weather data 50, NOTAM data 52 and any other provided data that may impact the trajectory of the aircraft. In the case of an approach procedure, the trajectory construction module 26 may apply a constraint of descent only approach without climb segments. The trajectory construction module 26 models the prevailing conditions when following the custom entered waypoints 206 to construct a predicted three-dimensional flight trajectory that the aircraft 10 is expected to fly. The trajectory construction module 26 thus outputs a three-dimensional flight path 72. In some embodiments, the trajectory construction module 26 back propagates from a destination (e.g. a runway or airport location) and its associated three-dimensional coordinate (altitude, latitude and longitude) and generates the flight leg connecting the final waypoint and the directly preceding waypoint. If the directly preceding waypoint has any user entered constraint, that constraint is considered when constructing the three-dimensional flight path 72. The trajectory construction module 26 repeats this process of constructing the three-dimensional flight path 72 starting from the final waypoint successively backwards.

The terrain conflict detection engine 36 receives terrain data 46 and the three dimensional flight path 72 and assesses the flight path 72 with respect to terrain conflicts along the flight path 72. That is, a comparison is made between elevation (e.g. peak elevation) included in each grid cell longitudinally and laterally aligned with the flight path 72 and the elevation of the flight path 72. When the flight path is sufficiently close (i.e. to within a safety clearance margin) or intercepts the terrain elevation, the terrain conflict detection engine 36 provides an terrain conflict output 56 indicating terrain conflict. The terrain conflict output 56 may include an indication of terrain conflict or absence of terrain conflict at each grid cell point along the flight path 72. Thus, not only is a terrain conflict indication provided but also the location of the terrain conflict is provided in the terrain conflict output 56.

The safety clearance margin may be a static variable retrieved from memory 40 or may be dynamically determined by the clearance altitude determination module 34. In embodiments, the clearance altitude determination module 34 takes into account navigation performance and the capabilities of the location detecting systems of the aircraft 10. The navigation performance refers to a level of navigation accuracy for a specific airspace block. A navigation performance of 0.3 means the aircraft navigation system is able to calculate its position to within a circle with a radius of 3 tenths of a Nautical Mile. The clearance altitude determination module 34 takes account of the navigation performance and calculates a smaller safety clearance altitude 74 if navigation performance accuracy is higher (e.g. with hybrid Inertial Reference System (IRS) or Global Positing System (GPS)). Otherwise, if the accuracy is lower, e.g. a VHF omnidirectional range (VOR) with distance measuring equipment (DME) (VOR-DME), then the safety clearance altitude 74 is kept higher. The clearance altitude determination module 34 may also take predicted Receiver Autonomous Integrity Monitor (RAIM), which predicts GPS integrity at a point in time and space into consideration and if GPS coverage is not available (or is of lower accuracy) in that estimated time along the flight path 72, the navigation performance accuracy will be low and hence the safety clearance altitude 74 is assigned to be higher.

The terrain grid resolution used by the terrain conflict detection engine 36 may be a static variable or a variable that is dynamically determined by the terrain grid resolution request module 37. The terrain grid resolution may be based on a sensitivity of the approach (e.g. arrival Required Navigation Performance (RNP) can be 1.0 while approach can be 0.3). That is, a closer the aircraft 10 is to the landing site, a higher terrain grid resolution 76 is called to the terrain database 44. In this way, finer granulated data is used at more critical parts of an approach procedure to detect terrain conflicts. The safety clearance altitude 74 and the terrain data 46 at the determined resolution is provided to the terrain conflict detection engine 36 for use in assessing whether the flight path 72 conflicts with terrain.

In embodiments, the terrain conflict output 56 is provided to a terrain avoidance recommendation module 28. The terrain avoidance recommendation module makes a recommendation as to what avoidance measures can be taken in order to terrain deconflict the flight path 72. For example, where the flight path intercepts terrain (or is within the terrain plus the safety clearance altitude 74), a recommendation may be made to insert an altitude constraint into a preceding waypoint, to reduce a flight path angle or to make a lateral diversion. The terrain avoidance recommendation module 28 thus outputs a terrain avoidance recommendation 78.

In embodiments, the output generation module 32 receives the terrain conflict output 56 from the terrain conflict detection engine 36 and the terrain avoidance recommendation 78 and generates a visual user interface 80 as described with respect to the examples of FIGS. 3 to 6. As will be described, the visual user interface 80 may include a lateral map and/or a vertical situation map that includes a depiction of terrain, particularly terrain that incurs on the flight path 72, and may additionally, or alternatively, color code or otherwise highly parts of the flight path 72 (e.g. a waypoint) that are associated with a terrain conflict. Further, the visual user interface may include a recommendation or prompt to the pilot to adjust the flight path to avoid the terrain.

Figure 3:
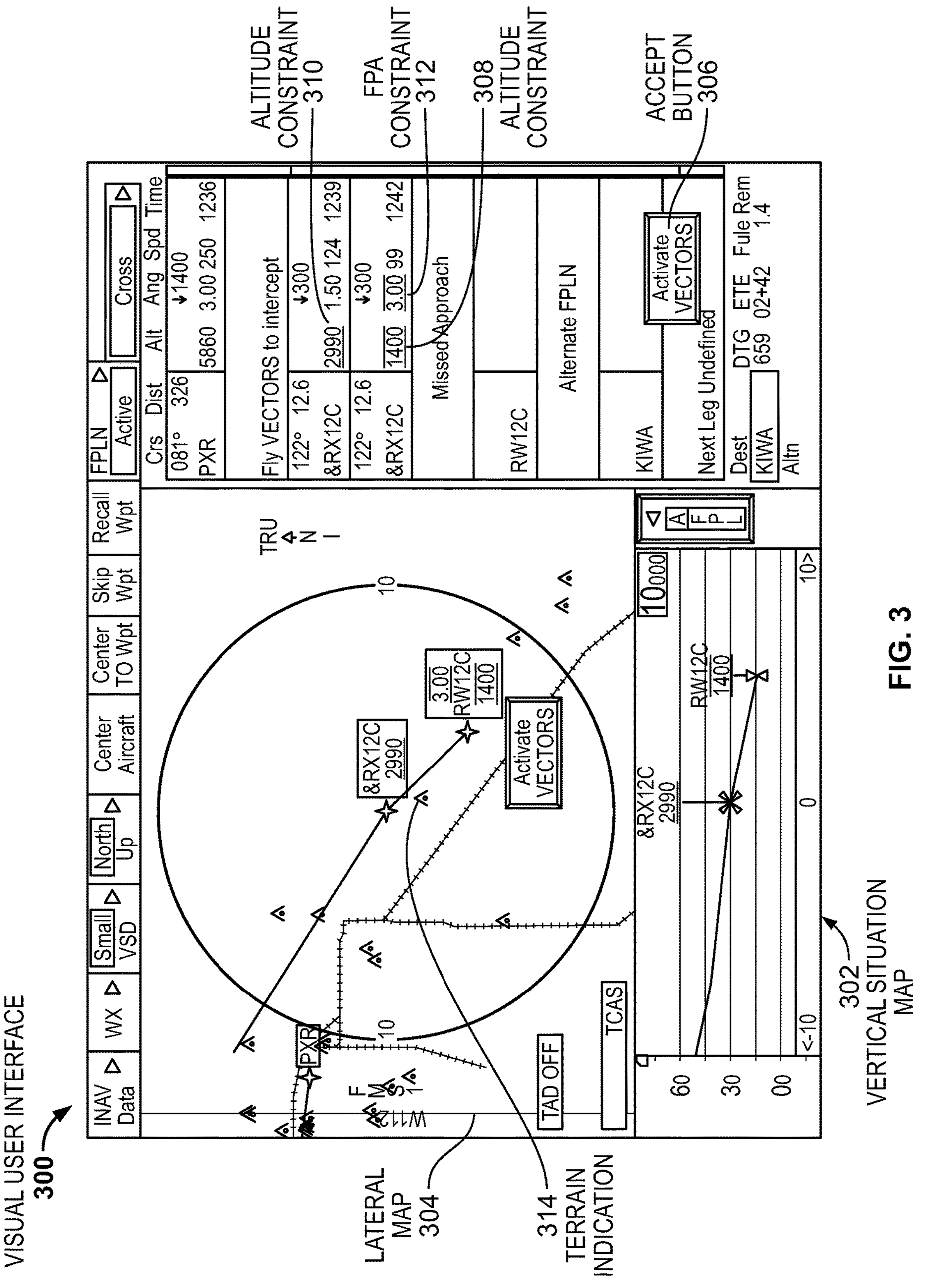
FIG. 3 depicts another exemplary visual user interface for entering a custom procedure, in accordance with exemplary embodiments

In the example of FIG. 3, a Visual Approach is being planned. The visual user interface 300 is generated first by the custom waypoint entry module 24 to include a button to select to build a straight-in, 3° (or other flight path angle entered by the pilot) glide path to a runway that has been selected. In this way, a custom approach has been defined by the pilot with a destination runway and flight path angle constraint. Referring to FIG. 3, it can be seen that a Flight Path Angle (FPA) constraint 312 has been entered for the final leg to the destination runway. The runway is also associated with an altitude constraint 308 based on runway elevation included in navigation data 54. In the present example, the pilot has also entered an altitude constraint for the preceding waypoint (namely at least 2990 feet). The trajectory construction module 26 takes the input custom procedure 70 and builds a flight path 72 starting from the destination waypoint and based on the flight path angle constraints 312, 310. The terrain conflict detection engine 36 assesses whether the flight path conflicts with terrain based on the terrain data 46 and the safety clearance altitude 74. The output generation module 32 generates a latera map including a terrain indication 314 showing locations of terrain and a vertical situation map 302. In the present example, the terrain conflict detection engine 36 did not find any terrain conflicts. As such, no terrain conflict advisories or terrain avoidance recommendations are provided. The visual user interface 300 includes an accept button 306 allowing the custom procedure 70 to be submitted to the FMS 18. The FMS 18 and an autopilot system controls the aircraft 10 to intercept the custom procedure and to fly the specified secondary (custom) flight plan.

Figure 4:
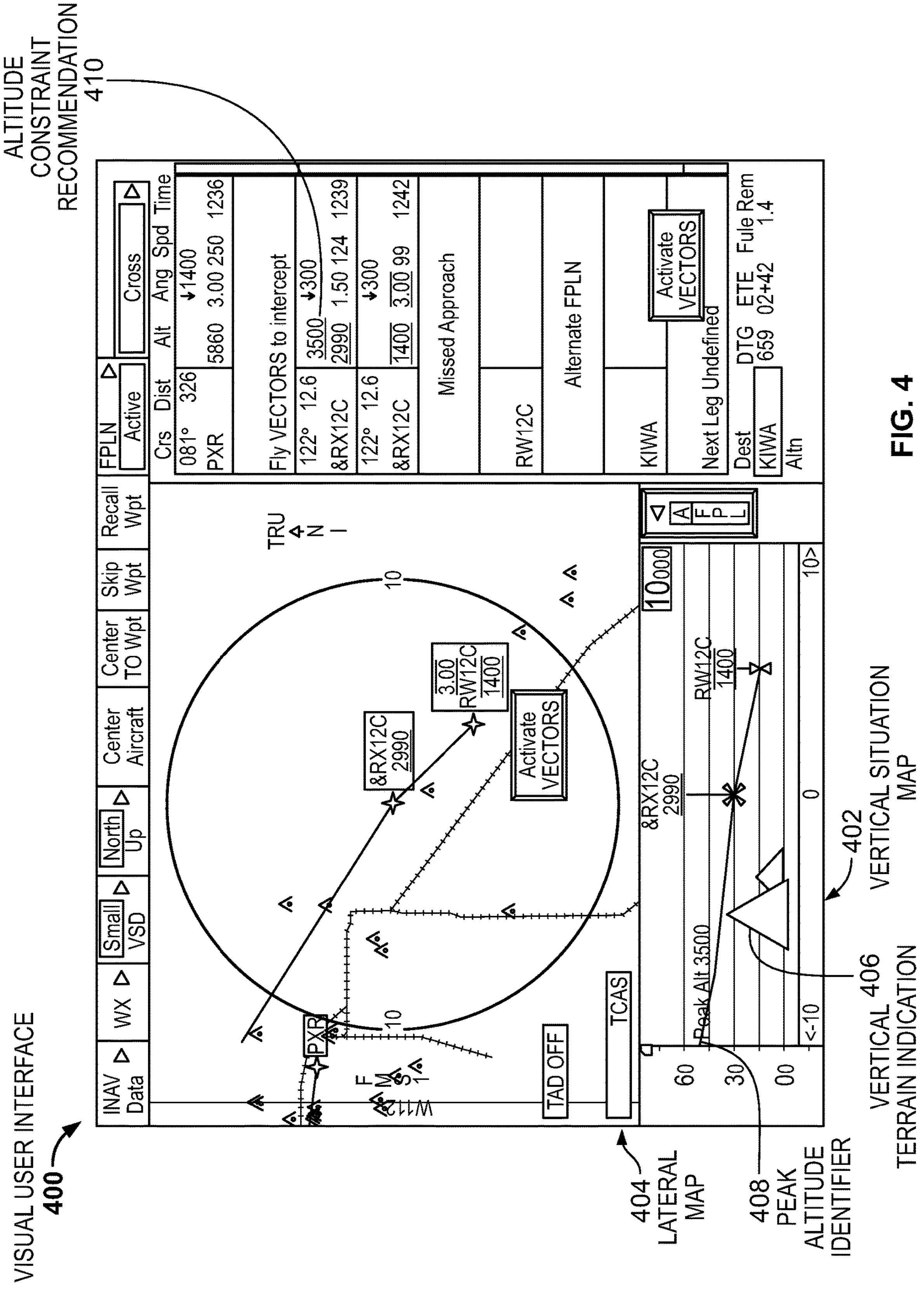
FIG. 4 depicts another exemplary visual user interface for entering a custom procedure that includes terrain indications, in accordance with exemplary embodiments.

In the example of FIG. 4, the custom procedure 70 has been entered by the pilot using the same inputs as with the example of FIG. 3. However, in this case, the terrain data 46 indicates a peak altitude of terrain of 3500 feet along the approach flight path 72 that has been created by the trajectory construction module 26. The terrain conflict detection engine 36 thus provides a terrain conflict output 56 indicating a location and elevation of a potential terrain conflict. A vertical terrain indication 406 is provided on the vertical situation map 402 providing a graphical representation of the potential terrain incursion. Further, a peak altitude identifier 408 is displayed that describes the peak elevation of the terrain at that location. The terrain avoidance recommendation module 28 proposes an altitude constraint recommendation 410 for the preceding waypoint from the destination runway of at least 3500 feet, which ensures that the flight path 72 avoids the terrain by at least the safety clearance altitude 74. In another solution, the terrain avoidance recommendation module may suggest a steeper flight path angle as a constraint for the final leg, thereby ensuring terrain avoidance. Once the pilot accepts the recommended altitude constraint, the flight path 72 is reconstructed and terrain conflict detection is performed again until a flight path 72 is created that is terrain deconflicted and follows a descent only route to the destination runway. The lateral map 404 and the vertical situation map 402 may include color coding or other highlighting to indicate where terrain conflict has been detected such as a color coded waypoint.

Figures 5A, 5B:
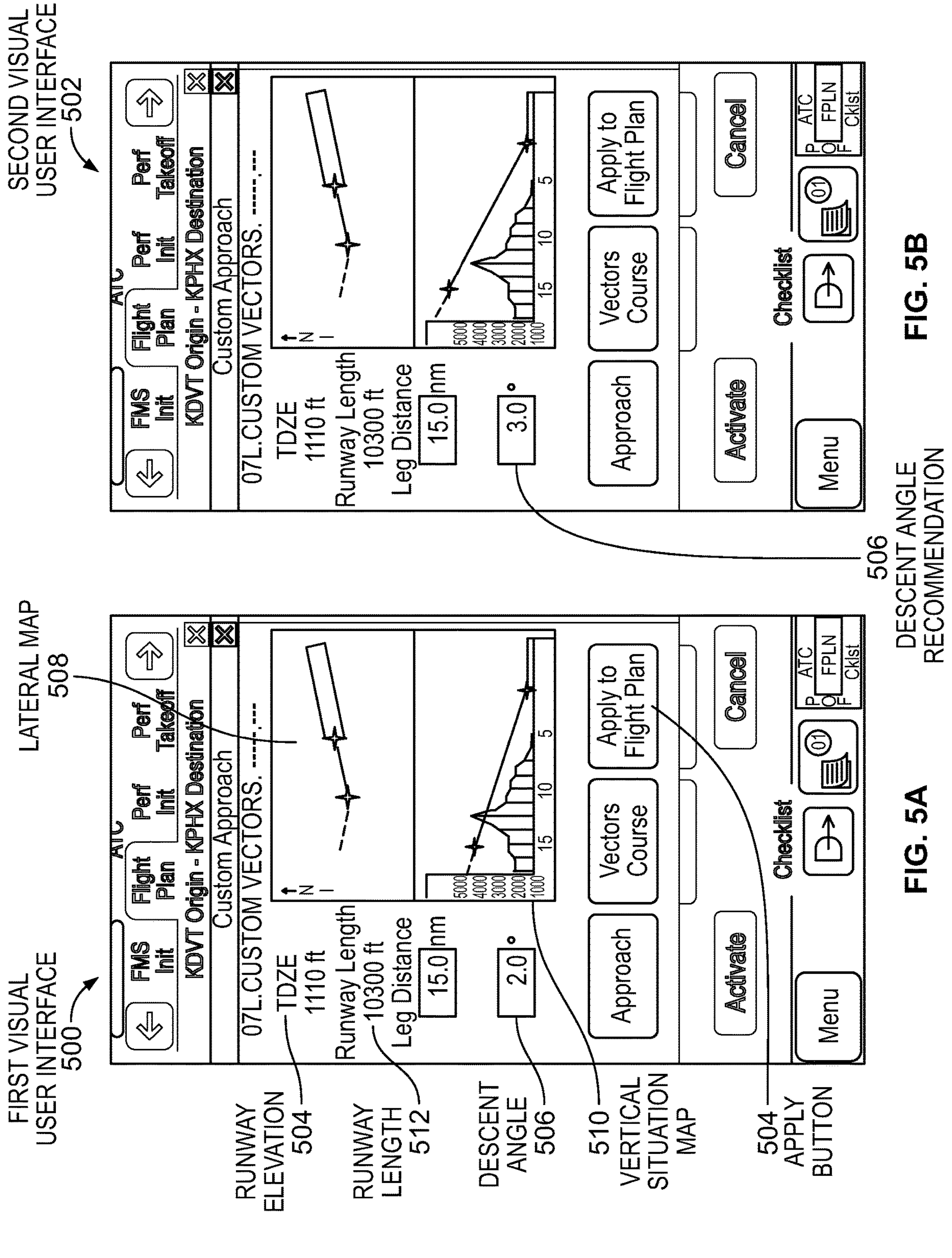
FIGS. 5A and 5B depict vertical situation displays including terrain indications, in accordance with exemplary embodiments.

In the example of FIGS. 5A and 5B, a first visual user interface 500 is depicted, which illustrates a custom approach interface allowing a pilot to enter a custom procedure. The custom waypoint entry module 24 and/or the output generation module 32 generates the first visual user interface 500. In the example of FIG. 5A, the pilot has entered a descent angle of 2°. Alternatively, the descent angle may be computer selected by auto-filling-in the descent angle using predetermined data retrieved from memory 40. Further, the pilot has selected a destination runway. Information associated with the destination runway may be retrieved from the navigation database 58 and included in the first visual user interface 500, such as runway elevation 504 and runway length 512. The trajectory construction module 26 draws a three-dimensional trajectory based on a preceding waypoint (which may also be pilot entered) or a current aircraft location, the descent angle and a location of the destination runway. The terrain conflict detection engine 36 retrieves elevation information (e.g. peak elevation) for the 3D flight path 72 and determined whether there will be any terrain incursion by following the 3D flight path 72. In the example of FIG. 5A, there is an overlap determined between the peak elevation and the 3D flight path, which is illustrated in a vertical situation map 510. The vertical situation map 510 includes a terrain peak elevation graph based on the terrain data 46 along the constructed 3D flight path 72. The graph is color codes so that locations of the flight path (in the vertical situation map 510) that conflict with the terrain are color coded different from locations that do not so conflict. Further, the terrain extending above the flight path can be seen in the vertical situation map 510, which further illustrates terrain conflict. The first visual user interface 500 thus indicates to the pilot that there is a terrain conflict issue and that the proposed custom procedure should not be followed.

In the second visual user interface 502, the terrain avoidance recommendation module 28 has determined upon a descent angle recommendation (of 3° in this example) that is not detected by the terrain conflict detection engine 36 to conflict with terrain. The terrain avoidance recommendation module 28 may iteratively adjust flight path angle or altitude constraints in a preceding waypoint to the terrain conflict to minimize an adjustment to the custom procedure but to still avoid the terrain and the safety clearance altitude 74 according to the terrain conflict output 56 from the terrain conflict detection engine 36. The flight path is re-drawn in the vertical situation map 510 using the adjusted descent angle recommendation so that the terrain can be seen to be located beneath the adjusted flight path, which is terrain deconflicted. Assuming the pilot finds the flight path adjustment to be acceptable, the custom procedure can be accepted and submitted to the FMS 18 by selecting the apply button 504.

Figure 6A:
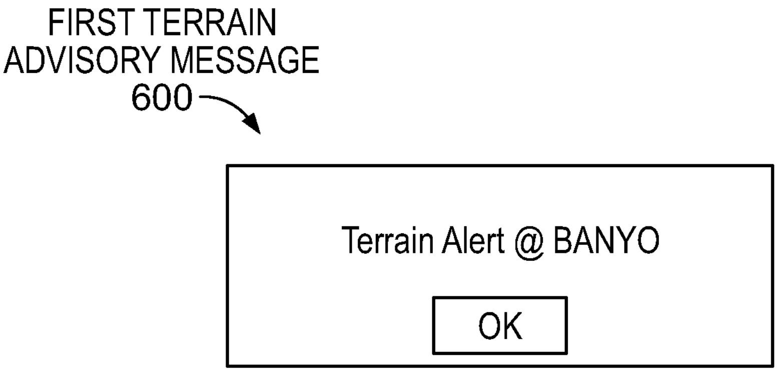
FIGS. 6A to 6C depict exemplary terrain advisories, in accordance with exemplary embodiments.
Figure 6B:
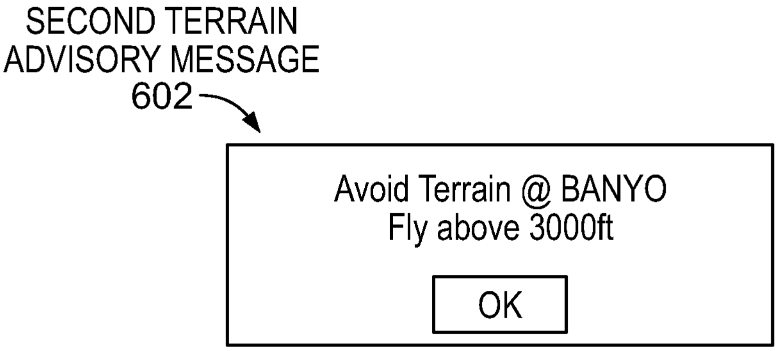
Figure 6C:
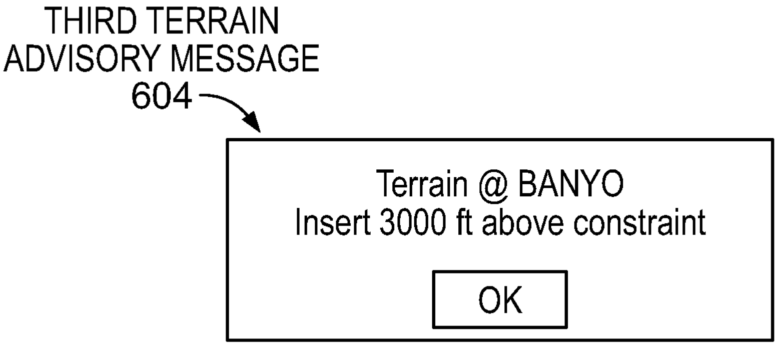

FIGS. 6A to 6C show exemplary terrain advisory messages 600, 602, 604 that could be provided as part of the output from the output generation module 32. The terrain advisory messages may be in the form of pop-ups on any flight display associated with the system 8 or can be included in one of the visual user interfaces described previously herein. In FIG. 6A, the terrain conflict detection engine 36 detects that there is a terrain conflict and a first terrain advisory message 600 is provided. In the first terrain advisory message 600 makes the pilot aware of the issue (and a location of the issue) but does not provide a recommendation as to resolving the issue. According to the second terrain advisory message 602 of FIG. 6B, a recommendation of what could be done to avoid the terrain conflict is provided to the pilot and the pilot should manually insert an altitude constraint in association with an identified waypoint. In the example of FIG. 6C, a third terrain advisory message 604 is provided that identifies a location for an altitude constraint to be inserted to a waypoint that avoids the terrain conflict. The third terrain advisory message 604 may be accompanied by an acceptance button to cause the altitude constraint recommendation to be inserted into the custom procedure or to be submitted to the FMS 18.

Figure 7:
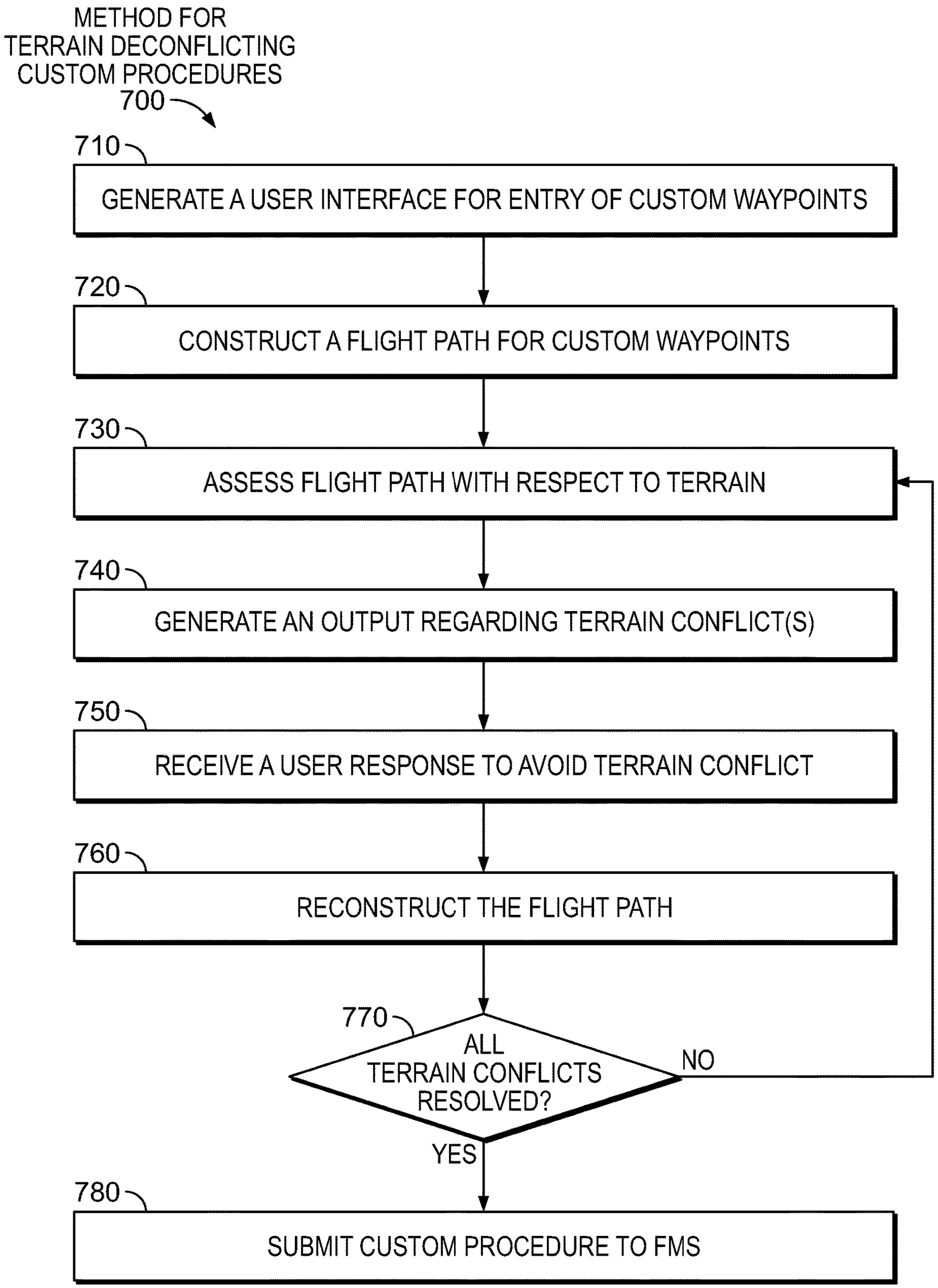
FIG. 7 is a flowchart of a method for terrain deconflicting custom procedures, in accordance with an embodiment.

A flow chart of an exemplary method 700 for terrain deconflicting custom procedures is provided in FIG. 7. The method 700 is computer implemented by the processing system 806 of FIG. 8 and/or by the various modules of the processing system 12 of FIG. 1.

In step 710, a visual user interface for entry of custom waypoints is generated. The visual user interface may be according to any of the visual user interfaces described herein with respect to FIGS. 2 to 5. The visual user interface allows a pilot to enter a series of custom waypoints and constrains associated with at least one or some of the entered waypoints. The constraints may be altitude, flight path angle (descent angle), vertical speed, etc. The custom waypoints may be entered by selecting pre-existing waypoints from a list, by entry of coordinates, by selection on a lateral map and/or by a rubber banding technique to modify an existing flight plan. Each waypoint defines lateral and longitudinal positions of the flight path and may be associated with further constraints as discussed.

In step 720, a 3D flight path 72 connecting the waypoints is constructed that takes into account the various constraints, particularly flight path angle and altitude constraints. In an approach procedure, the flight path is constructed starting at the landing site (e.g. a selected destination runway) and propagating backwards through the waypoints. Further, the terrain assessment of step 730 is performed in the same order as the flight path is constructed. In some embodiments, terrain conflict advisories are issued for the flight plan including all the waypoints of the custom procedure or just for part of the flight plan that has been constructed so far until a terrain conflict has been detected, starting from the destination runway and working backwards. In some embodiments, the flight path 72 is constructed to factor in temperature compensated altitudes for each waypoint, any degraded aircraft performances (like engine out) according to the aircraft state data 48 and other external factors (like weather according to the weather data 50 and any flying restrictions according to, for example, the notam data 52).

In step 730, the flight path 72 constructed in step 720 is assessed with respect to terrain using the terrain data 46 at each location along the flight path 72 to assess whether the flight path will incur on terrain (or the peak elevation of terrain plus the safety clearance altitude 74). The terrain grid resolution called from the terrain database 44 may be set for use in step 730 according to an RNP level of the procedure, which may be retrieved from the navigation database 58. This may be particularly the case where an existing approach procedure is being adjusted by loading an approach procedure from the navigation database 58 and adjusting the loaded procedure in the user interface for defining the custom procedure using rubber banding. The loaded approach procedure may be associated with an RNP in the navigation database 58 and this can be taken as an input for dynamically determining the grid resolution. In particular, a finer RNP being available for a given approach procedure allows for a finer grid resolution to be called, thereby avoiding nuisance alerts. In step 730, the assessment or detection of terrain conflict may be performed with respect to peak terrain included in the terrain database 44 and also an additional safety clearance altitude 74. The safety clearance altitude 74 may be preset or dynamically determined. If dynamically determined, the safety clearance altitude 74 may be determined based on a precision of navigation data (self-localization) for the aircraft 10 predicted for each location along the flight path. The higher the precision, the smaller the safety clearance altitude.

In step 740, an output is generated regarding any terrain conflicts detected in step 730 based on the part of the flight path having been so far assessed (starting from the destination and propagating backwards). The output may include a visual user interface including an advisory regarding terrain conflict. The advisory can be a notification of the terrain conflict or include a recommendation of a flight constraint to be inserted to avoid the terrain conflict, as described with respect to FIGS. 6A to 6C. Further, the visual user interface can include a vertical situation map depicting a terrain graph and a flight plan to show any cross over therebetween indicating terrain conflict. The visual user interface may also include a lateral map and color coding to indicate where along the flight plan (in either the vertical or lateral maps) there is terrain conflict.

In step 750, a user response is received to the terrain conflict detection and associated output. The user response may be insertion of a constraint or acceptance of a recommended constraint, where the constraint serves to adjust that part of the flight path to avoid the terrain conflict. The user response may include dragging and dropping a waypoint (or flight path segment) to a new lateral location using the lateral map of the visual user interface or dragging and dropping (e.g. rubber banding) a waypoint or flight path segment in the vertical situation map of the visual user interface. In step 760, the flight path is reconstructed based on the waypoints and the adjusted constraints received in step 750 and iteratively propagating backwards from the destination runway along the custom procedure and repeating steps 230 to 260. It should be appreciated that where no terrain conflict is detected in step 730, steps 240 to 260 may not be performed and a visual user interface is generated that indicates terrain clearance and provides a button for submitting the custom flight plan to the FMS 18, such as the second visual user interface 502 of FIG. 5B.

In step 770, the method determines whether all terrain conflicts have been resolved. If not, the method loops back to step 730 to continue assessing for terrain conflicts and resolving terrain conflicts by iteratively repeating steps 730 to 760 starting from a destination end of the custom procedure. Once all terrain conflicts have been determined to be resolved in step 770, the custom procedure is submitted to the FMS 18 and the FMS 18 and the autopilot (or the flight path may be flown by the pilot without an autopilot) work together to fly the aircraft 10 along the custom procedure.

Figure 8:
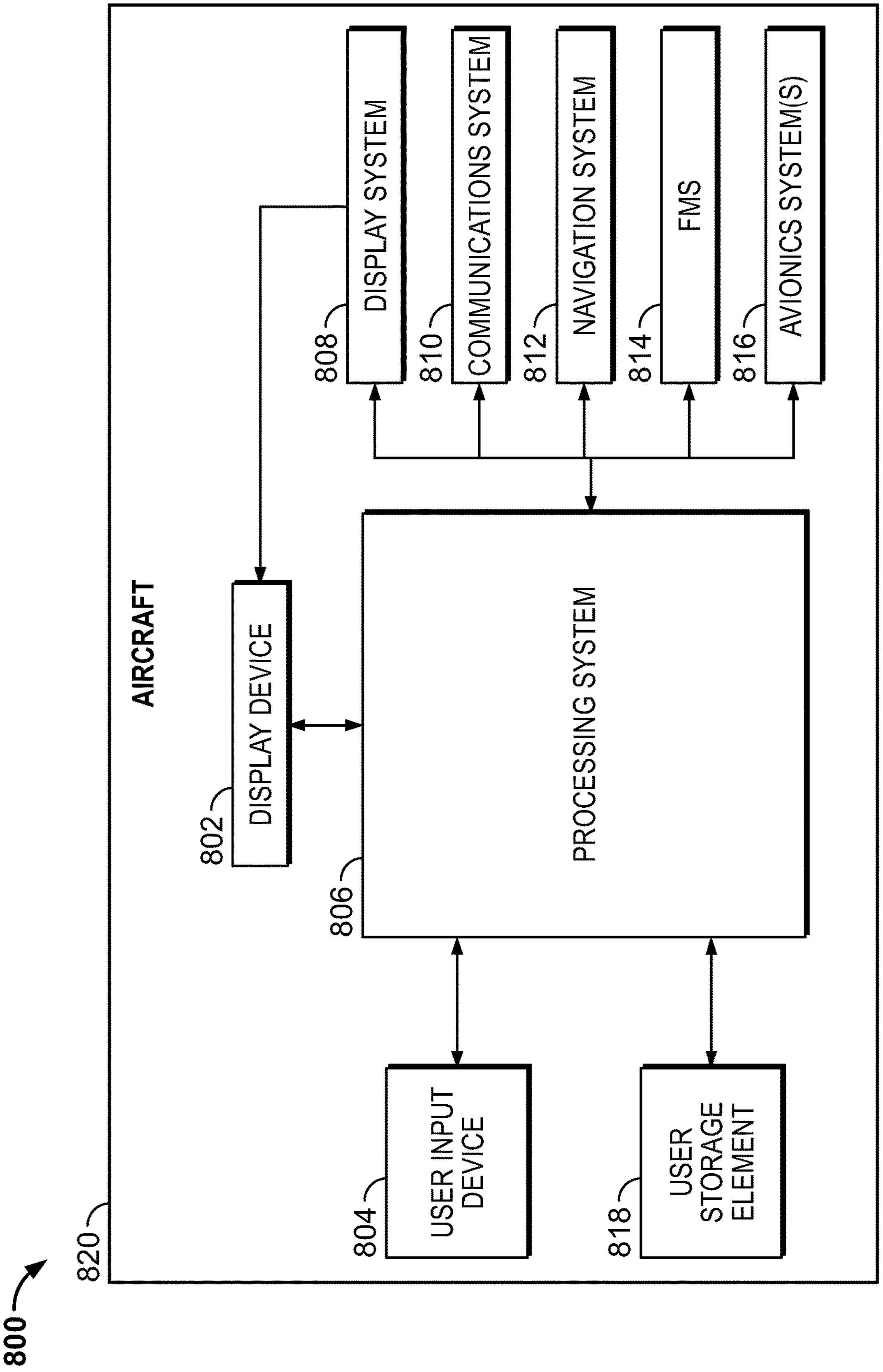
FIG. 8 depicts an exemplary embodiment of an aircraft system suitable for terrain deconflicting custom procedures, in accordance with one or more embodiments.

FIG. 8 depicts an exemplary embodiment of an aircraft system 800 suitable for implementing the system 8 of FIG. 1. The illustrated aircraft system 800 (corresponding to system 8 of FIG. 1) includes, without limitation, a display device 802 (corresponding to display device 110 of FIG. 1), one or more user input devices 804, a processing system 806 (for implementing functions and methods described herein with respect to system 8), a communications system 810, a navigation system 812, a flight management system (FMS) 814 (corresponding to the FMS 18 of FIG. 1), one or more avionics systems 816, and a data storage element 518 (suitably configured to support operation of the system 800).

In exemplary embodiments, the display device 802 is realized as an electronic display capable of graphically displaying flight information or other data associated with operation of the aircraft 820 under control of the display system 508 and/or processing system 806. In this regard, the display device 802 is coupled to the display system 808 and the processing system 806, wherein the processing system 806 and the display system 808 are cooperatively configured to display, render, or otherwise convey one or more graphical representations or images associated with operation of the aircraft 820 on the display device 802. The user input device 804 is coupled to the processing system 806, and the user input device 804 and the processing system 806 are cooperatively configured to allow a user (e.g., a pilot, co-pilot, or crew member) to interact with the display device 802 and/or other elements of the system 800, as described herein. Depending on the embodiment, the user input device(s) 804 may be realized as a keypad, touchpad, keyboard, mouse, touch panel (or touchscreen), joystick, knob, line select key or another suitable device adapted to receive input from a user. In some embodiments, the user input device 804 includes or is realized as an audio input device, such as a microphone, audio transducer, audio sensor, or the like, that is adapted to allow a user to provide audio input to the system 800 in a "hands free" manner without requiring the user to move his or her hands, eyes and/or head to interact with the system 800.

The processing system 806 generally represents the hardware, software, and/or firmware components configured to facilitate communications and/or interaction between the elements of the aircraft system 800 and perform additional tasks and/or functions to support the system 8 of FIG. 1 during operation of the aircraft system 800, as described herein. Depending on the embodiment, the processing system 806 may be implemented or realized with a general-purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 806 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 806 includes processing logic that may be configured to carry out the functions, techniques, and processing tasks associated with the operation of the aircraft system 800, as described herein. Furthermore, the steps of a method or algorithm described in connection with the embodiments disclosed herein may be embodied directly in hardware, in firmware, in a software module executed by the processing system 806, or in any practical combination thereof. For example, in one or more embodiments, the processing system 806 includes or otherwise accesses a data storage element 818 (or memory), which may be realized as any sort of non-transitory short- or long-term storage media capable of storing programming instructions for execution by the processing system 806. The code or other computer-executable programming instructions, when read and executed by the processing system 806, cause the processing system 806 to support or otherwise perform certain tasks, operations, and/or functions described herein in the context of the flight rules alerts. Depending on the embodiment, the data storage element 818 may be physically realized using RAM memory, ROM memory, flash memory, registers, a hard disk, or another suitable data storage medium known in the art or any suitable combination thereof.

The display system 808 generally represents the hardware, software, and/or firmware components configured to control the display and/or rendering of one or more navigational maps and/or other displays pertaining to operation of the aircraft 820 and/or onboard systems 810, 812, 814, 816 on the display device 802. In this regard, the display system 808 may access or include one or more databases suitably configured to support operations of the display system 808, such as, for example, a terrain database, an obstacle database, a navigational database, a geopolitical database, a terminal airspace database, a special use airspace database, or other information for rendering and/or displaying navigational maps and/or other content on the display device 802.

Still referring to FIG. 8, in an exemplary embodiment, the processing system 806 is coupled to the navigation system 812, which is configured to provide real-time navigational data and/or information regarding operation of the aircraft 820. The navigation system 812 may be realized as a global navigation satellite system (e.g., a global positioning system (GPS), a ground-based augmentation system (GBAS), a satellite-based augmentation system (SBAS), and/or the like), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 812, as will be appreciated in the art. The navigation system 812 is capable of obtaining and/or determining the instantaneous position of the aircraft 820, that is, the current (or instantaneous) location of the aircraft 820 (e.g., the current latitude and longitude) and the current (or instantaneous) altitude or above ground level for the aircraft 820. The navigation system 812 is also capable of obtaining or otherwise determining the heading of the aircraft 820 (i.e., the direction the aircraft is traveling in relative to some reference). In the illustrated embodiment, the processing system 806 is also coupled to the communications system 810, which is configured to support communications to and/or from the aircraft 820. For example, the communications system 810 may support communications between the aircraft 820 and air traffic control or another suitable command center or ground location. In this regard, the communications system 810 may be realized using a radio communication system and/or another suitable data link system.

In an exemplary embodiment, the processing system 806 is also coupled to the FMS 814, which is coupled to the navigation system 812, the communications system 810, and one or more additional avionics systems 816 to support navigation, flight planning, and other aircraft control functions in a conventional manner, as well as to provide real-time data and/or information regarding the operational status of the aircraft 820 to the processing system 806. Although FIG. 8 depicts a single avionics system 816, in practice, the aircraft system 800 and/or aircraft 820 will likely include numerous avionics systems for obtaining and/or providing real-time flight-related information that may be displayed on the display device 802 or otherwise provided to a user (e.g., a pilot, a co-pilot, or crew member). For example, practical embodiments of the aircraft system 800 and/or aircraft 820 will likely include one or more of the following avionics systems suitably configured to support operation of the aircraft 820: a weather system, an air traffic management system, a radar system, a traffic avoidance system, an autopilot system, an autothrust system, a flight control system, hydraulics systems, pneumatics systems, environmental systems, aircraft systems, engine systems, trim systems, lighting systems, crew alerting systems, electronic checklist systems, an electronic flight bag and/or another suitable avionics system. In various embodiments, the processing system 806 may obtain information pertaining to the current location and/or altitude of the aircraft 820 and/or other operational information characterizing or otherwise describing the current operational context or status of the aircraft 820 from one or more of the onboard systems 808, 810, 812, 814, 816.

It should be understood that FIG. 8 is a simplified representation of the aircraft system 800 for purposes of explanation and ease of description, and FIG. 8 is not intended to limit the application or scope of the subject matter described herein in any way. It should be appreciated that although FIG. 8 shows the various elements of the system 800 being located onboard the aircraft 820 (e.g., in the cockpit), in practice, one or more of the elements of the system 800 may be located outside the aircraft 820 (e.g., on the ground as part of an air traffic control center or another command center) and communicatively coupled to the remaining elements of the aircraft system 800 (e.g., via a data link and/or communications system 810). For example, in some embodiments, the data storage element 818 may be located outside the aircraft 820 and communicatively coupled to the processing system 806 via a data link and/or communications system 810. Furthermore, practical embodiments of the aircraft system 800 and/or aircraft 820 will include numerous other devices and components for providing additional functions and features, as will be appreciated in the art. In this regard, it will be appreciated that although FIG. 8 shows a single display device 802, in practice, additional display devices may be present onboard the aircraft 820. Additionally, it should be noted that in other embodiments, features and/or functionality of processing system 806 described herein can be implemented by or otherwise integrated with the features and/or functionality provided by the FMS 814. In other words, some embodiments may integrate the processing system 806 with the FMS 814. In yet other embodiments, various aspects of the subject matter described herein may be implemented by or at an electronic flight bag (EFB) or similar electronic device that is communicatively coupled to the processing system 806 and/or the FMS 814.

For the sake of brevity, conventional techniques related to sensors, statistics, data analysis, avionics systems, redundancy, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method for creating a custom approach procedure for an aircraft, comprising:

receiving, via at least one processor and from a first user interface, a plurality of user entered waypoints constituting a provisional custom approach procedure;

constructing, via the at least one processor, a three-dimensional (3D) flight path connecting the waypoints with a constraint that the 3D flight path is a descent path with no climb segments;

obtaining, via the at least one processor, terrain data along the 3D flight path from a terrain database;

assessing, via the at least one processor, the 3D flight path with respect to the terrain data to detect one or more terrain conflicts;

generating, via at least one processor, a plurality of terrain advisory messages on at least one of the first user interface or a second user interface, wherein a first terrain advisory message indicates only the detection of the one or more terrain conflicts and after receiving a user acknowledgement of the first terrain advisory message via at least one of the first user interface or second user interface, generating, via the at least one processor, a second terrain advisory message via at least one of the first user interface or second user interface comprising a terrain peak elevation graph depicting the one or more terrain conflicts along the 3D flight path and a recommendation to implement at least one of a lateral constraint, an altitude constraint, and a flight path angle constraint for one or more of the waypoints to avoid the one or more terrain conflicts;

receiving a user response to implement the recommendation of the second terrain advisory message via the second user interface;

reconstructing a revised 3D flight path in accordance with the implementation of the recommendation responsive to the user response, the revised 3D flight path being reconstructed as a descent path with no climb segments;

and iteratively performing, via the at least one processor, the assessing, generating, receiving and reconstructing steps until terrain conflicts are not detected, thereby providing a terrain deconflicted custom approach procedure constituted by the user entered waypoints.

2. The method of claim 1, wherein the output includes an advisory of terrain conflict.

3. The method of claim 1, wherein the output includes inserting the at least one of the lateral constraint, the altitude constraint and the flight path angle constraint for the one or more of the waypoints or other part of the 3D flight path to remove the one or more terrain conflicts.

4. The method of claim 1, wherein the terrain data is arranged in grid cells, the grid cells associated with the 3D flight path are determined, peak terrain elevation data for each grid cell is extracted from the terrain database as the terrain data and the assessing includes assessing with respect to peak terrain elevation data.

5. The method of claim 1, wherein constructing and reconstructing the 3D flight path includes factoring in at least one of: temperature compensated altitudes, any degraded aircraft performances, weather and flying restrictions.

6. The method of claim 1, wherein the output includes a vertical situation interactive display configured to receive vertical revisions to the 3D flight path.

7. The method of claim 6, wherein the vertical revisions include at least one of angle, altitude and steps.

8. The method of claim 6, wherein the vertical situation interactive display includes a depiction of the terrain data.

9. The method of claim 1, wherein the terrain data is arranged in grid cells of adaptable resolution and wherein the terrain data is called with a grid resolution based on required navigation performance.

10. The method of claim 1, wherein assessing the 3D flight path with respect to the terrain data to detect the one or more terrain conflicts includes comparing terrain height plus a safety margin with the 3D flight path.

11. The method of claim 10, wherein the safety margin is adapted based on accuracy of navigation performance.

12. The method of claim 1, comprising submitting, via the at least one processor, the terrain deconflicted custom approach procedure to a Flight Management System of the aircraft.

13. The method of claim 1, wherein receiving the plurality of user entered waypoints includes allowing user entry of waypoints by a rubber banding technique.

14. The method of claim 1, wherein the constructing the three-dimensional (3D) flight path begins at a final leg connecting a landing site and a final waypoint and wherein the assessing, generating, receiving and reconstructing are performed by sequential back propagation from the final leg.

15. The method of claim 1, wherein:

the output further includes a terrain advisory message comprising a pop-up including the at least one of the lateral constraint, the altitude constraint, and the flight path angle constraint and an acceptance button for display on the visual user interface, and the user response comprises activation of the acceptance button.

16. A system for creating a custom approach procedure, comprising:

a user interface;

at least one processor in operable communication with the user interface, the at least one processor configured to execute program instructions, wherein the program instructions are configured to cause the at least one processor to:

receive a plurality of user entered waypoints constituting a provisional custom approach procedure from the user interface; construct a three-dimensional (3D) flight path connecting the waypoints with the constraint that the 3D flight path is a descent path with no climb segments;

obtain terrain data along the 3D flight path from a terrain database;

assess the 3D flight path with respect to the terrain data to detect one or more terrain conflicts;

generate, via the at least one processor, a plurality of terrain advisory messages on at least one of the first user interface or a second user interface, wherein a first terrain advisory message indicates only the detection of the one or more terrain conflicts and after receiving a user acknowledgement of the first notification message via at least one of the first user interface or second user interface, generate an output comprising: a second user interface, a second terrain advisory message via at least one of the first user interface or second user interface, wherein the second user interface is a visual user interface comprising a terrain peak elevation graph depicting the one or more terrain conflicts along the 3D flight path and a recommendation to implement at least one of a lateral constraint, an altitude constraint, and a flight path angle constraint for one or more of the waypoints to avoid the one or more terrain conflicts;

receive a user response to implement the recommendation of the second terrain advisory message via the second user interface;

reconstruct a revised 3D flight path in accordance with the implementation of the recommendation responsive to the user response, the revised 3D flight path being reconstructed as a descent path with no climb segments;

and iteratively perform the assessing the 3D flight path, generating the output, receiving the user response and reconstructing the revised 3D flight path until terrain conflicts are not detected, thereby providing a terrain deconflicted custom approach procedure constituted by the user entered waypoints.

17. The system of claim 16, wherein the output includes an advisory of terrain conflict.

18. The system of claim 16, wherein the terrain data is arranged in grid cells, the grid cells associated with the 3D flight path are determined, peak terrain elevation data for each grid cell is extracted from the terrain database as the terrain data and the assessing step includes assessing with respect to peak terrain elevation data.

19. The system of claim 16, wherein receiving the plurality of user entered waypoints includes allowing user entry of waypoints by a rubber banding technique.

20. The system of claim 16, wherein:

the output further includes a terrain advisory message comprising a pop-up including the at least one of the lateral constraint, the altitude constraint, and the flight path angle constraint and an acceptance button for display on the visual user interface, and the user response comprises activation of the acceptance button.

* * * * *